Aug. 29, 1950

R. R. KILIAN 2,520,552

BAIT CASTING REEL

Filed Feb. 14, 1946

INVENTOR:
Rudolph R. Kilian,
BY
Bodell & Thompson
ATTORNEYS.

Patented Aug. 29, 1950

2,520,552

UNITED STATES PATENT OFFICE 2,520,552

BAIT CASTING REEL

Rudolph R. Kilian, Baldwinsville, N. Y.

Application February 14, 1946, Serial No. 647,507

4 Claims. (Cl. 242—84.5)

This invention relates to fishing reels, and particularly to reels having means by which they are especially adapted for bait casting, and has for its object a brake mechanism which releases under the pull of the plug bait on the line unwinding from the reel, so that the reel unwinds free of the brake while the bait is pulling on the line under the momentum imparted to the bait during the casting and the brake is automatically re-applied when the line tends to develop slack.

The invention consists in the novel features and in the combinations and constructions hereinafter set forth and claimed.

In describing this invention, reference is had to the accompanying drawings in which like characters designate corresponding parts in all the views.

Figure 1:
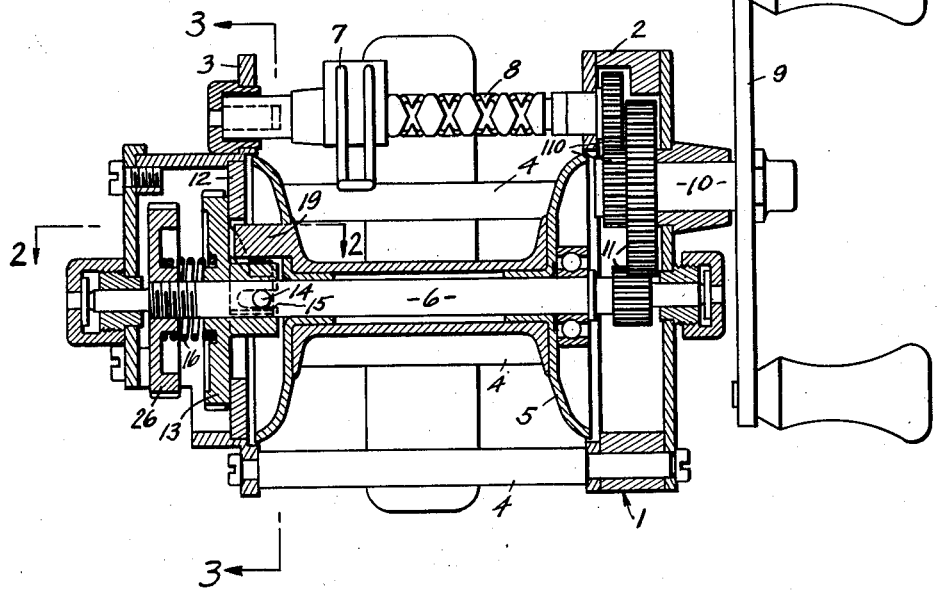
Figure 1 is an elevation, partly in section, of a reel embodying this invention.
Figures 2, 3:
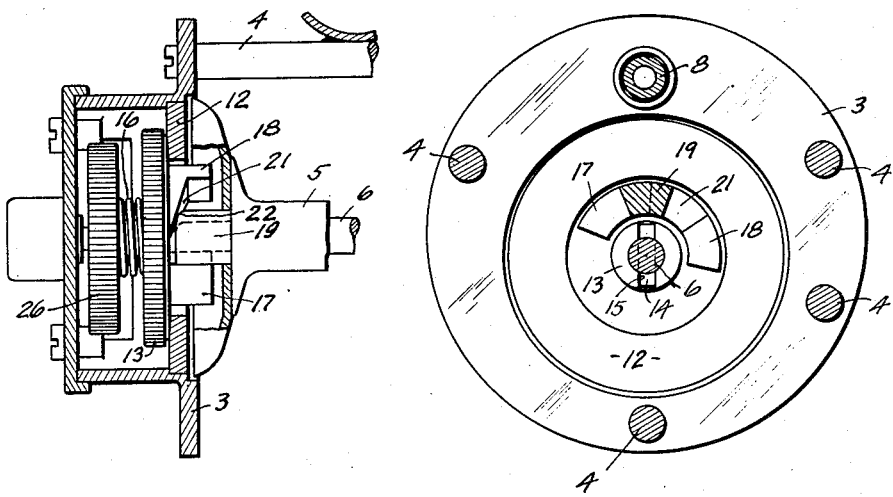
Figure 2 is a sectional view taken on the plane of line 2—2, Figure 1.
Figure 3 is a sectional view taken on the plane of line 3—3, Figure 1.

1 designates the frame of the reel, which may be of any suitable construction, it including the heads 2, 3 and tie rods 4 connecting them. 5 designates the line spool, this being mounted on a spindle 6 suitably journalled in the heads 2, 3.

7 designates the usual guide for the line to distribute it evenly when it is winding on the spool, this guide being movable along a rod 8 having right and left intersecting spiral grooves joined at their ends and the guide a follower in the groove. The spindle 6 is rotated to wind the reel in any suitable manner, as by a crank handle 9 mounted on a stud 10 which is connected to the spindle 6 at one end thereof through a train of gears 11. There is also a train of gears 110 to the rod 8 to rotate it. The train of gears is mounted within the head 2 which is formed hollow to form a housing for the gearing.

12 is an annular brake ring mounted in the head 3 opposed to the adjacent head of the spool 5. 13 is a brake member mounted on the spindle 6 and opposed to the brake ring 12, the brake member 13 having a hub on the spindle 6 which is keyed thereto by a pin 14 extending through the spindle and into slots 15 in the hub of the brake member 13. The brake member 13 is shiftable axially and is self-resetting when the force holding it disengaged ceases. As shown, the clutch member is reset by a spring 16 which normally thrusts it into frictional engagement with the brake ring 12. The spool 5 is wound by the spindle through a lost motion connection or device which permits the spool to overrun to turn the spindle when the spool is being unwound by the pull on the line under the momentum of the bait or plug when passing through the air. Means is provided for shifting the brake member 13 out of engagement with the brake ring 12 when the spool so overruns under the pull of the bait on the line unwinding from the spool and the lost motion is being taken up in one direction. The lost motion device, as here shown, consists of circumferentially spaced shoulders or lugs 17, 18 on the brake member 13 and a shoulder or lug 19 on the adjacent head of the spool and working between the shoulders 17, 18. When winding the reel by the handle 9, the lug 18 presses against the shoulder 19 on the spool.

The means for shifting the brake member against its spring 16 are cam parts, as an inclined plane surface 21 between the shoulders 17, 18 with its low point toward the shoulder 17 on an end face 22 on the shoulder 19.

When casting, as the force on the plug bait causes it to exert a strong pulling force on the line and hence to unwind the line from the spool, the shoulder 19 moves up the inclined plane surface, thus camming the brake wheel 13 out of frictional engagement with the brake ring 12. However, as soon as the plug bait loses its forward momentum or slack tends to develop in the line, the brake spring re-acts and resets the brake, and in so doing, cams the shoulder 19 down the inclined plane toward the lug 17. The brake spring 16 thrusts in opposite directions against a finger-operated adjusting nut 26 threading on the spindle 6 and the brake member 13, the nut 26 being adjustable to regulate the amount of friction or brake action between the member 13 and the brake ring 12.

In reeling in the line, the drag of the plug-bait in the water or the stronger pull of a fish on the plug will actuate the brake release, so that the reeling-in operation is free from the resistance of brake friction, as during this operation, the shoulder 19 on the reel is pulled to the high area of the inclined plane 21. When the plug, or fish, is free of the water, and the pull on the line lessens tending to develop a sudden overwinding of the reel, the shoulder 19 shifts to the low area of the inclined plane 21, permitting the brake member or disk 13 to be reapplied.

What I claim is:

1. A bait casting reel including a frame, a spindle mounted in the frame, a spool mounted on the spindle, and means for rotating the spindle to wind the line on the spool, a stationary brake surface on the frame, an axially-shiftable, spring-pressed brake member normally engaging the said brake surface, and coacting means on the spool and said shiftable brake member to shift the brake member out of braking position under the rotation of the spool by the pull of the bait on the line unwinding from the spool, the brake spring acting to engage the brake when the pull on the line ceases and the line tends to become slack.

2. A bait casting reel including a frame, a spindle mounted in the frame, a spool mounted on the spindle, and means for rotating the spindle to rotate the spool, a stationary brake surface on the frame, an axially-shiftable, self-resetting, spring-pressed brake member normally engaging said brake surface, a driving connection between the brake member and the spool including a lost motion device and coacting cam parts on the brake member and the spool operable to shift the brake member against its spring, when the spool is being rotated by the pull of the bait on the line.

3. A bait casting reel including a frame, a spindle mounted in the frame, a line spool mounted on the spindle, a connection between the spindle and the spool to rotate the spool with the spindle including a lost motion device, means for actuating the spindle, a friction brake for normally retarding the rotation of the spindle under the pull on the line including a spring-pressed, self-resetting shiftable member rotatable with the spindle and constituting a part of the lost motion device, and cam means embodied in the lost motion device and operable to shift the shiftable brake member against its spring when the spool is rotating under the pull of the line and the lost motion is being taken up in one direction, the resetting of the shiftable brake member by its spring when the line slackens causing the cam means to take up the lost motion in the other direction.

4. A bait casting reel including a frame, a spindle mounted in the frame, a line spool mounted on the spindle, a friction brake for normally retarding the rotation of the spool under the pull of the line including a self-resetting shiftable member mounted on the spindle and rotatable therewith and shiftably axially thereof, said brake member being provided with spaced apart shoulders and an inclined plane between the shoulders, the spool being provided with a driving lug extending between the shoulders and coacting with the inclined plane, and means for rotating the spindle.

RUDOLPH R. KILIAN.

REFERENCES CITED

The following references are of record in the file of this patent:

UNITED STATES PATENTS

| Number | Name | Date |
|---|---|---|
| 1,753,738 | Boyer | Apr. 8, 1930 |
| 2,324,324 | Rutledge | July 13, 1943 |

FOREIGN PATENTS

| Number | Country | Date |
|---|---|---|
| 301,963 | Great Britain | Dec. 10, 1928 |